United States Patent
Ma et al.

(10) Patent No.: US 7,180,874 B2
(45) Date of Patent: Feb. 20, 2007

(54) METHOD FOR PROVIDING VOICE/DATA AND INFORMATION COMMUNICATION IN A DECT RADIO COMMUNICATION SYSTEM

(75) Inventors: Kuo Yung Ma, Hsinchu (TW); Chao Yin Liu, Hsinchu (TW)

(73) Assignee: Windbond Electronics Corp., Hscinhu (TW)

( * ) Notice: Subject to any disclaimer, the term of this patent is extended or adjusted under 35 U.S.C. 154(b) by 1151 days.

(21) Appl. No.: 10/103,973

(22) Filed: Mar. 25, 2002

(65) Prior Publication Data

US 2003/0016652 A1 Jan. 23, 2003

(30) Foreign Application Priority Data

Jul. 17, 2001 (TW) .............................. 90117460 A

(51) Int. Cl.
*H04Q 7/00* (2006.01)
(52) U.S. Cl. .................................... 370/328
(58) Field of Classification Search ............ None
See application file for complete search history.

(56) References Cited

U.S. PATENT DOCUMENTS

| 5,493,609 | A | * | 2/1996 | Winseck et al. ............. 370/433 |
| 5,521,925 | A | * | 5/1996 | Merakos et al. ............. 370/337 |
| 5,892,794 | A | * | 4/1999 | Slegers ........................ 370/336 |
| 6,690,943 | B1 | * | 2/2004 | Forde et al. ................. 455/518 |
| 6,891,816 | B2 | * | 5/2005 | Smith et al. ................. 370/335 |
| 2002/0042272 | A1 | * | 4/2002 | Wedi et al. .................. 455/442 |

* cited by examiner

*Primary Examiner*—Chi Pham
*Assistant Examiner*—Anh-Vu Ly
(74) *Attorney, Agent, or Firm*—Nixon Peabody LLP; Donald R. Studebaker

(57) ABSTRACT

The invention includes the steps of: (1) during the $0^{th}$ frame, setting value of an extend flag of zero length paging message through P-channel to be 1 for informing the portable terminal to receive the paging message within the $2^{nd}$ frame; (2) during the frames of a first-type following the $2^{nd}$ frame, via a data/voice field, broadcasting the information to the portable terminal.

7 Claims, 5 Drawing Sheets

| P | S | A | B |

Fig.1

PRIOR ART

| Frame No. | Priority scheme | Frame No. | Priority scheme |
|---|---|---|---|
| 0 | P,N | 1 | M,C,N |
| 2 | P,N | 3 | M,C,N |
| 4 | P,N | 5 | M,C,N |
| 6 | P,N | 7 | M,C,N |
| 8 | Q | 9 | M,C,N |
| 10 | P,N | 11 | M,C,N |
| 12 | P,N | 13 | M,C,N |
| 14 | N | 15 | M,C,N |

Fig.2

PRIOR ART

| Extend flag | Length Indication | Page Data |
|---|---|---|

Fig.3(a)

PRIOR ART

| Extend flag | Length Indication | Paging Data | Info Type | MAC Layer Information |
|---|---|---|---|---|

Fig.3(b)

PRIOR ART

| Extend flag | Length Indication | RFPI | Info Type | MAC Layer Information |
|---|---|---|---|---|

Fig.3(c)

PRIOR ART

| Extend flag | Length Indication | RFPI | ESCAPE | C/L Broadcast control |
|---|---|---|---|---|
| | | | | |

Fig.4

| C/L Control Indication | C/L Information Identification | C/L information Segment Number |
|---|---|---|
| | | |

Fig.5

METHOD FOR PROVIDING VOICE/DATA AND INFORMATION COMMUNICATION IN A DECT RADIO COMMUNICATION SYSTEM

FIELD OF THE INVENTION

The present invention relates to a method for providing voice/data and information communication in a DECT radio communication system.

CROSS REFERENCE TO RELATED APPLICATIONS

BACKGROUND OF THE INVENTION

Digital Enhanced Cordless Telecommunications is a standard developed by the European Telecommunication Standard Institute from 1988, governing pan-European digital mobile telephony. DECT covers wireless PBXs, telepoint, residential cordless telephones, wireless access to the public switched telephone network, Closed User Groups (CUGs), Local Area Networks, and wireless local loop.

The DECT Common Interface radio standard is a multi-carrier time division multiple access and time division duplex (MC-TDMA-TDD) radio transmission technique. The technique uses ten radio frequency channels from 1880 to 1930 MHz, each divided into 24 time slots of 10 ms, and twelve full duplex accesses per carrier.

A DECT base station (an RFP, Radio Fixed Part) can transmit all 120 possible accesses by using different frequencies or using only one frequency. All signaling information is transmitted from the RFP within a multi-frame (16 frames). Voice signals are digitally encoded into a 32 kbit/s signal using Adaptive Differential Pulse Code Modulation.

FIG. 1 shows a time slot data format in the DECT Radio Communication system. "P" represents a preamble field. "S" represents a synchronized field. "A" represents a protocol related signal field called Frame A for short. "B" represents the user data/voice field called Frame B for short. And in the specification below, C/L represents connectionless.

The DECT Radio Communication system presently provides two kinds of C/L downlink services. The C/L refers to the connective state that the portable terminal doesn't respond to the base station while the portable terminal is locked with the base station. Corresponsively, the connection-oriented refers to the connective state that the portable terminal responds to the base station while the portable terminal is connected with the base station. The first kind of C/L downlink service (SHORT) doesn't influence the proceeding data/voice transmission by using frame A to transmit information, but it is only suitable for the short information transmission. The second kind of C/L downlink service (LONG) is suitable for the long information transmission by using frame B to transmit information, but it influences the proceeding data/voice transmission. The influenced voice is harsh to humans' ear.

Generally, the first technology mentioned above is used to broadcast information to all terminals. The second technology is used to broadcast information to specific terminals for avoiding the interference problem.

As shown in FIG. 2, the MAC (media access control) layer has five logical channels, P, Q, N, M and C. P channel is the MAC paging channel. Q channel is the system information channel. M channel is the MAC layer control channel. N channel is the identities channel. C channel is the Higher layer (data link control) information channel. These logical channels transmit following the T-MUX algorithm as shown in FIG. 2. FIG. 2 shows that P channel transmits messages only during the $0^{th}$, $2^{nd}$, $4^{th}$, $6^{th}$, $10^{th}$, $12^{th}$ frames. To distinguish the difference between message and information in the specification below, the paging data on P channel is called message and the data sent by the C/L service is called information.

Furthermore, the first message on the P channel must be transmitted during the $0^{th}$ frame within a multi-frame. If there exists a need to transmit paging message within the following frames, the system will need to set values in extend flags within the format except the $12^{th}$ frame. The extend flag within the $12^{th}$ frame is set to 0. Those are the particular using rule of P channel.

FIG. 3 discloses the DECT MAC layer P channel paging format. FIG. 3(a) discloses the page format of the full-length page message. FIG. 3(b) discloses the paging format of the short paging message. FIG. 3(c) discloses the paging format of the zero length paging message. When the full-length message is transmitted, the paging format of the full-length message includes extend flag frame (1 bit), length information frame (3 bits) and paging data frame (36 bits). When the short paging message is transmitted, the paging format of short page message includes extend flag frame (1 bit), length information frame (3 bits), paging data frame (20 bits), info-type (4 bits) and MAC layer information (12 bits). When the zero length paging message is transmitted, the paging format of zero length page message includes extend flag frame (1 bit), length information frame (3 bits), base station identification number least significant 20 bits frame (20 bits), info-type (4 bits) and MAC layer information (12 bits).

SUMMARY OF THE INVENTION

An object of the present invention is to provide a method for providing Voice/Data and Information Communication in a DECT Radio Communication System. The method doesn't influence the DECT system standard transmitting procedure.

Another object of the present invention is to provide a method for providing Voice/Data and Information Communication in a DECT Radio Communication System. The method can let all portable terminals receive information by using channel P's characteristic.

Still another object of the present invention is to provide a method for providing Voice/Data and Information Communication in a DECT Radio Communication System. The method only cause slight influence on the voice transmission in the using time slot.

Yet another object of the present invention is to provide a method for providing Voice/Data and Information Communication in a DECT Radio Communication System. The method transmits long message to all portable terminals by using B field.

The DECT radio communication system includes at least a base station and a portable terminal. The DECT radio communication system includes M frequency channels, each channel includes N time slots. The base station transmits signal data to said portable terminal through multiple frames. A data format corresponding to each time slot includes a preamble field, a synchronization field, a protocol related signal field and a data/voice field. The multiple frames include a first-type frame for transmitting a P-channel data and a N-channel data. The P-channel data is used for media access control paging. The first-type frame includes a $0^{th}$, a $2^{nd}$, a $4^{th}$, a $6^{th}$, a $10^{th}$, a $12^{th}$ frame. The method includes the steps of:

(1) during the $0^{th}$ frame, setting value of an extend flag of zero length paging message through P-channel to be 1 for informing said portable terminal to receive the paging message within the $2^{nd}$ frame;

(2) during the frames of a first-type following the $2^{nd}$ frame, via a data/voice field, broadcasting the information to said portable terminal.

BRIEF DESCRIPTION OF THE DRAWINGS

FIG. 1 discloses a time slot data format in a DECT system.

FIG. 2 discloses the DECT MAC Layer T-Mux algorithm for base station transmission.

FIG. 3(a),(b),(c) discloses the DECT MAC Layer P channel page format.

FIG. 4 discloses the DECT MAC Layer P channel page format with info type is Escape.

FIG. 5 discloses the redefinition of the C/L broadcast control field shown in FIG. 4 of the present invention.

DETAILED DESCRIPTION OF THE INVENTION

Figure 6A:
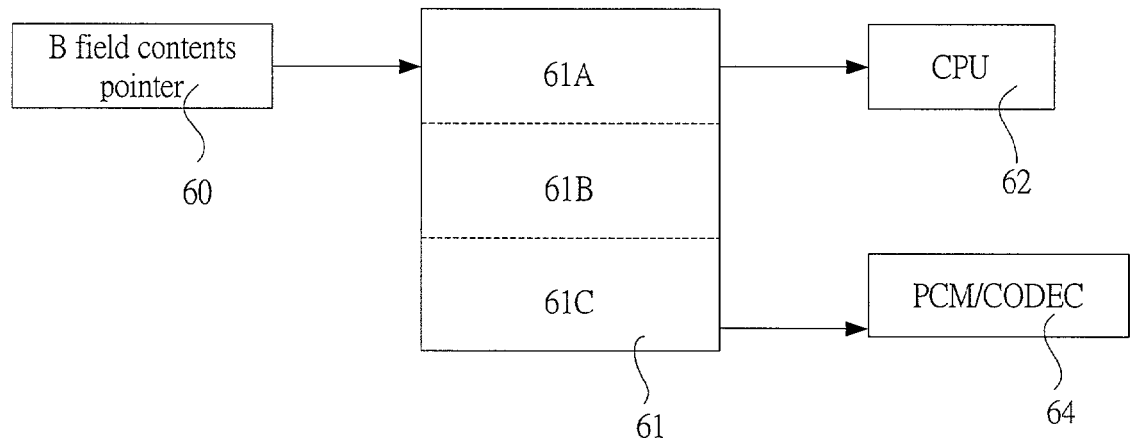
FIG. 6(a) discloses a C/L downlink data buffer, a data buffer, a voice buffer and the pointing state of the pointer when the system transmits data and broadcasting information at same time.

Whether the portable terminal is connected with the base station or not, the portable terminal receives the paging message within the $0^{th}$ frame and determines whether receiving the following paging message according to the extend flag. With this characteristic, the present invention uses B field to broadcast long information to all portable terminals.

The present invention defines an ESCAPE code by using the info-type (4 bits) field (with reference to FIG. 3) within the paging format of zero length page message of the MAC P channel. The embodiment of ESCAPE code is (0,1,1,1). When ESCAPE code is decoded, it represents that the following 12 bits can be the broadcast control, with reference to FIG. 4.

According to an embodiment of the present invention, the 12 bits of broadcast control is divided into 3 fields and the definitions are shown in FIG. 5. The first field is a control indication field. The second field is an information identification-C/L_ID field for only identifying an entire C/L_ID data. The third field is information segment number field.

According to an embodiment of the present invention, the value of control indication is (0,0,1,1), the rest of field reserved. Information segment number (0,0,0) represents initial B field broadcast. The third field (0,0,1) represents broadcast segment number 1. The third field (0,1,0) represents broadcast segment number 2. The third field (0,1,1) represents broadcast segment 3. The third field (1,0,0) represents broadcast segment 4, and the rest may be inferred by analogy. The third field (1,1,1) represents last broadcast segment.

Due to the arrangement of the FIG. 4 and FIG. 5, the present invention executes the following process when a message broadcasts to all portable terminals by using downlink server. Before introducing the process of FIG. 7, refer to FIG. 6(a) and FIG. 6(b). Both the base station and the portable terminal have hardwave devices shown in FIG. 6 such as the B field pointer 60 storing the value of B field, buffer 61A, 61B, 61C respectively storing the C/L downlink message, CPU 62 and PCM/CODEC 64 (pulse coded modulation/ encoder/ decoder). The PCM/CODEC is used to boost the speaker by converting the digital voice to analog signal. Since data and voice can be transmitted at same time, buffer 61B and 61C can substantially be in the same position or not.

When B field contents pointer points towards 61B, B field is used to transmit data and data within 61B is transmitted to CPU 62. When B field contents pointer points towards 61C, B field is used to transmit voice and data within 61C is transmitted to PCM/CODEC 64. When B field contents pointer points towards 61A, B field is used to transmit C/L downlink message and the downlink message within 61A is transmitted to CPU 62.

Figure 7:
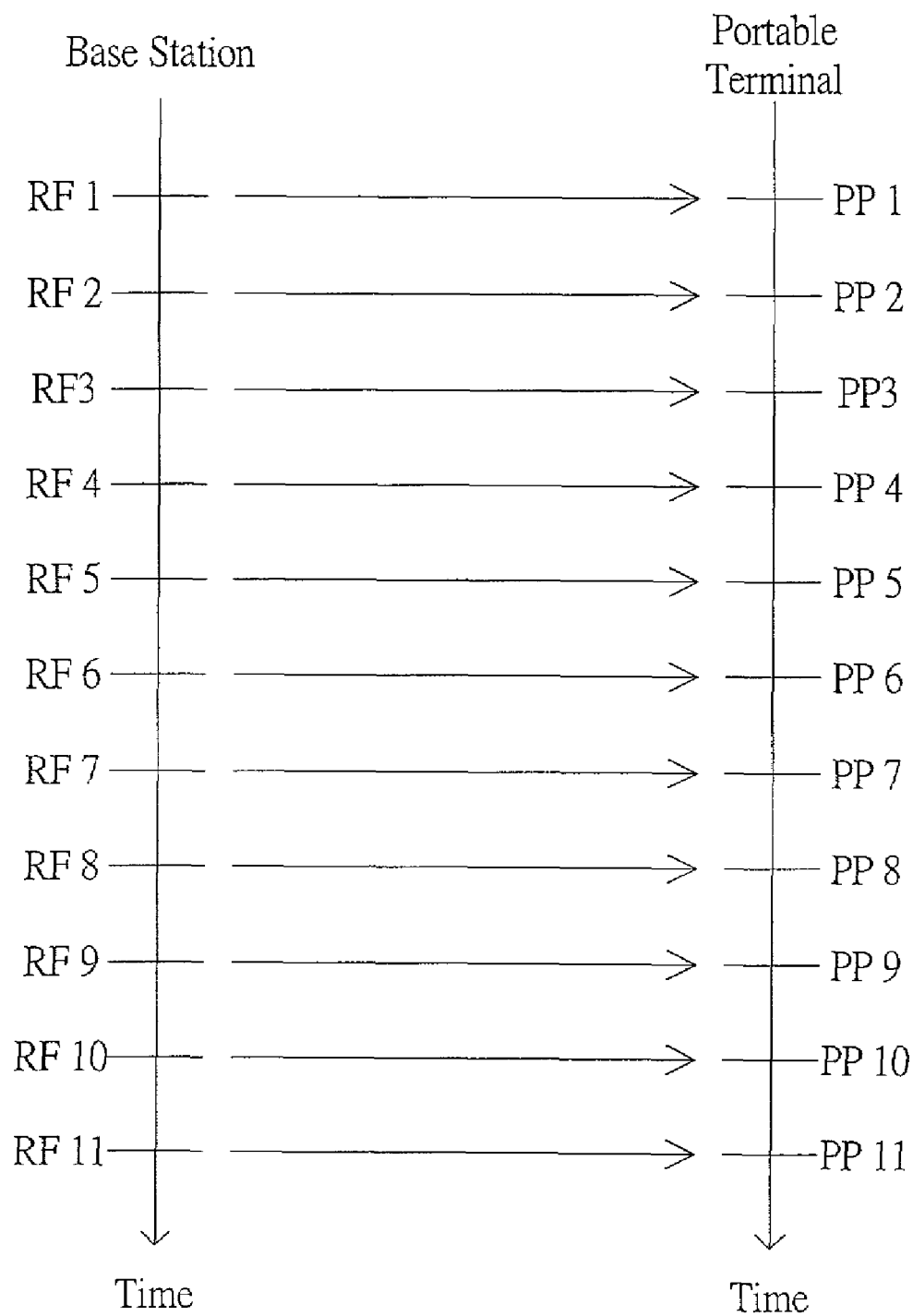
FIG. 7 discloses the procedure that the base station and the portable terminal execute.

The Procedure of the Base Station(with Reference to FIG. 7)

(RF1) set value of an extend flag of zero length paging message of the MAC paging data to be 1 during the $0^{th}$ frame for informing said portable terminal to receive the paging message within the $2^{nd}$ frame. Since the manner doesn't use the $0^{th}$ frame to transmit data, it doesn't influence the original data broadcast.

(RF2) transmit zero length paging data during the $2^{nd}$ frame. The content of data is:
extend flag=1, length indication=0,0,0
RFPI=20 least significant bits of RFPI
MAC info type=ESCAPE
Control indication=0,0,1,1
Information identification=C/L_ID
Information segment no=0,0,0

Furthermore, the base station informs the portable terminal to consecutively receive one paging message within the $4^{th}$ frame, and to prepare receiving message in the data/voice field.

Figure 6B:
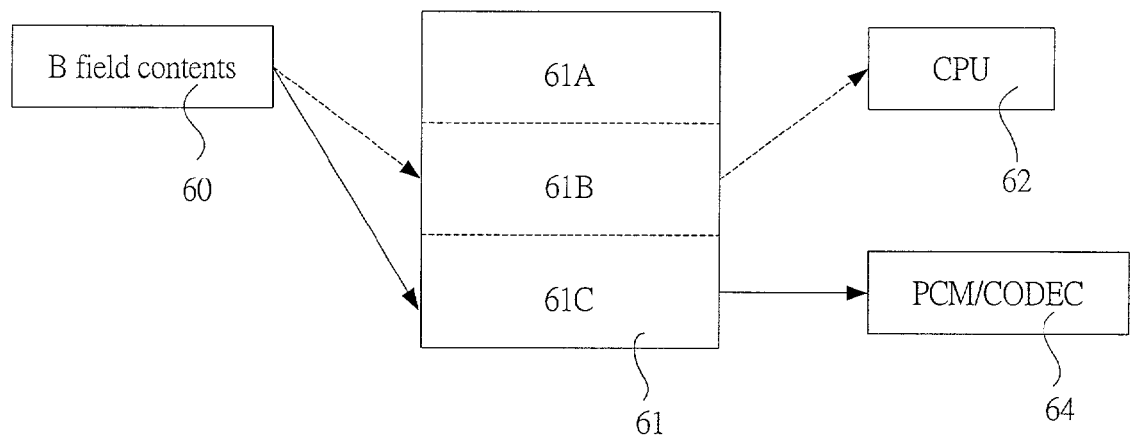
FIG. 6(b) discloses a C/L downlink data buffer, a data buffer, a voice buffer and the pointing state of the pointer during the normal voice transmission.

With reference to FIG. 6(a), (RF3) write information into a C/L downlink data buffer 61A during the $4^{th}$ frame, and change value of a data/voice field pointer buffer 60 in the time slot to point towards the downlink data buffer 61A. In the moment, the C/L downlink message within 61A of the present invention is transmitted to CPU 62. The present invention transmits voice of a preceding frame within 61C to PCM/CODEC 64. PCM/CODEC 64 broadcasts the voice of previous 10 ms, and transmits zero length paging data. The contents of data are:
The Transmission of Information Dose Not Finish
extend flag=1, length indication=0,0,0
RFPI=20 least significant bits of RFPI
MAC info type=ESCAPE
Control indication=0,0,1,1
Information identification=C/L_ID
Information segment no=0,0,1 (or 0,1,0 or 0,1,1 or other values.) The portable terminal prepares to receive next paging message during the $6^{th}$ frame.
The Transmission of Information has Finished
extend flag=1, length indication=0,0,0
RFPI=20 least significant bits of RFPI
MAC info type=ESCAPE
Control indication=0,0,1,1
Information identification=C/L_ID
Information segment no 32 1,1,1. Finish the broadcast procedure.

With reference to FIG. 6, (RF4) during the 5$^{th}$ frame, change value of the data/voice field pointer buffer 60 in the time slot to point towards a voice buffer 61C of data buffer 61B for transmitting the voice or data. If B field is not used, the value of the data/voice field pointer buffer 60 will be changed to null value.

With reference to FIG. 6(*a*), (RF5) write information into the C/L downlink data buffer 61A, and change value of the voice/data field pointer buffer 60 in the time slot to point towards the downlink data buffer 61A. In the moment, the C/L downlink message within 61A of the present invention is transmitted to CPU 62. The present invention transmits voice of a preceding frame within 61C to PCM/CODEC 64. PCM/CODEC 64 broadcasts the voice of previous 10 ms, and transmits zero length paging data. The contents of data are:

The Transmission of Information Dose Not Finish
extend flag=1, length indication=0,0,0
RFPI=20 least significant bits of RFPI
MAC info type=ESCAPE
Control indication=0,0,1,1
Information identification=C/L_ID
Information segment no=0,1,0 (or 0,1,1 or other values.)
  The portable terminal prepares to receive next paging message during 10$^{th}$ frame.
The Transmission of Information Has Finished
extend flag=1, length indication=0,0,0
RFPI=20 least significant bits of RFPI
MAC info type=ESCAPE
Control indication=0,0,1,1
Information identification=C/L_ID
Information segment no=1,1,1. Finish the broadcast procedure.

(RF6) execute the same procedure as RF4 during the 7$^{th}$ frame.

(RF7) execute the same procedure as RF5 during the 10$^{th}$ frame.

(RF8) execute the same procedure as RF4 during the 11$^{th}$ frame.

(RF9) execute the same procedure as RF5 during the 12$^{th}$ frame. Since this is the last frame, Extend Flag is set to 0, and information segment number is set to (1,1,1). Finish the broadcast procedure.

(RF10) execute the same procedure as RF4 dose during the 13$^{th}$ frame.

(RF11) finish the broadcast procedure.

Portable Terminal Procedure (with Reference to FIG. 7)

(PP1) receive the paging message of the P channel. The value of an extend flag of zero length paging message is 1 representing that there are following messages within the 2$^{nd}$ frame.

(PP2) consecutively receive the paging message of the P channel. The content of data is:
extend flag=1, length indication=0,0,0
RFPI=20 least significant bits of RFPI
MAC info type=ESCAPE
Control indication=0,0,1,1
Information identification=C/L_ID
Information segment no=0,0,0
This represents frame 2 is an enable frame of C/L downlink message, preparing to receive the following page message and preparing the B field to store C/L downlink message.

With reference to FIG. 6(*a*), (PP3) point the value of B field pointer 60 in the time slot towards downlink data buffer 61A to receive data of the channel P. Confirm the data is the downlink information, i.e. confirm extend flag=1, length indication=0,0,0, RFPI=20 least significant bits of RFPI, MAC info type=ESCAPE, control indication=0,0,1,1, information identification=C/L_ID, information segment no=0,0,1(or 0,1,0 or 0,1,1 or other values).

Store the value of RFPI, the value of C/L_ID and the value of information segment no for the reintegration of the following downlink information.

Check the extend flag and information segment number, and confirm if there are following paging message for determining weather to receive downlink information during next frame.

(PP4) the portable terminal points value of B field pointer buffer 60 in the time slot towards voice buffer 61C of data buffer 61B for receiving the voice or data.

(PP5) if there are following downlink information, the portable terminal will receive the information same as PP3 during the 6$^{th}$ frame.

(PP6) the portable terminal executes the same procedure as PP4 during the 7$^{th}$ frame.

(PP7) if there are following downlink information, the portable terminal will receives the information same as PP3 during the 10$^{th}$ frame.

(PP8) the portable terminal executes the same procedure as PP4 during the 11$^{th}$ frame.

(PP9) if there are following downlink information, the portable terminal will receive the information same as PP3 during the 12$^{th}$ frame.

(PP10) the portable terminal executes the same procedure as PP4 during the 13$^{th}$ frame.

(PP11) finish the receiving procedure.

The advantages of the present invention mentioned above are:

1. Because not use the paging information of the 0$^{th}$ frame and the 8$^{th}$ and 14$^{th}$ frames transmit messages of Q and N channel with the DECT rule, the present invention doesn't influence the transmission of MAC message and the procedure of DECT.

2. All portable terminals can receive the code of the present which is attach to the P channel.

3. C/L broadcast information transmits information by using B field during the intervening frame except the 8$^{th}$ and 12$^{th}$ frame.

4. The present invention stores downlink information into a corresponding buffer. The system also changes value of B field pointer buffer to point towards voice, data or downlink buffer, and to selectively broadcast downlink information. Since the voice of 10 ms is very short and the new voice data will be transmitted every other frame, there are little influence on the time slot which been used during the broadcasting C/L information period. Humans hardly hear the interfered or changed voice.

5. The information amount broadcast by using B field is great than that transmitted by using A field.

What is claimed is:

1. A method for providing voice/data and information communication in a DECT radio communication system, said DECT radio communication system comprising at least a base station and a portable terminal, said DECT radio communication system comprising M frequency channels, each channel comprising N time slots, said base station transmitting signal data to said portable terminal through multiple frames, a data format corresponding to each time slot comprising a preamble field, a synchronization field, a protocol related signal field and a data/voice field, said multiple frames comprising a first-type frame for transmitting a P-channel data and a N-channel data, said P-channel data being used for media access control paging said first-type frame comprising a $0^{th}$, a $2^{nd}$, a $4^{th}$, a $6^{th}$, a $10^{th}$, a $12^{th}$ frame, the method comprising the steps of:

(1) during the $0^{th}$ frame, setting value of an extend flag of zero length paging message through P-channel to be 1 for informing said portable terminal to receive a paging message within the $2^{nd}$ frame;

(2) during the frames of a first-type following the $2^{nd}$ frame, via a data/voice field, broadcasting the information to said portable terminal.

2. The method of claim 1, the step (2) comprising the steps of:

during the $2^{nd}$ frame, transmitting a zero length paging data for informing said portable terminal to consecutively receive one paging message within the $4^{th}$ frame and said portable terminal preparing to receive a message in the data/voice field.

3. The method of claim 2, the step (2) further comprising:

during the $4^{th}$ frame, writing information to a downlink data buffer and changing value of a data/voice field pointer buffer in a corresponding time slot to point towards said downlink data buffer for broadcasting information, and informing the portable terminal selectively preparing to receive next paging message or finish broadcast process during the $6^{th}$ frame.

4. The method of claim 3, the step (2) further comprising:

during a $5^{th}$ frame, changing value of said data/voice field pointer buffer in said time slot to point towards a voice or a data buffer for transmitting said voice or data.

5. The method of claim 4, the step (2) further comprising:

during the $6^{th}$ frame, writing information into said downlink data buffer, changing value of said voice/data field pointer buffer in a corresponding time slot to point towards said downlink data buffer for transmitting information, and informing the portable terminal selectively preparing to receive next paging message or finish broadcast process during the $10^{th}$ frame.

6. A method for providing voice/data and information communication in a DECT radio communication system, said DECT radio communication system comprising at least a base station and a portable terminal, said DECT radio communication system comprising M frequency channels, each channel comprising N time slots, said base station transmitting signal data to the portable terminal through multiple frames, a data format corresponding to each time slot comprising a preamble field, a synchronization field, a protocol related signal field and a data/voice field, said multiple frames comprising a first-type frame and a second-type frame, said first-type frame transmitting a P-channel data and a N-channel data, said P-channel data being used for media access control paging, said first-type frame comprising a $0^{th}$, a $2^{nd}$, a $4^{th}$, a $10^{th}$, a $12^{th}$ frame, the method comprising the steps of:

(1) during the $0^{th}$ frame, setting value of an extend flag of zero length paging message through P-channel to be 1 for informing said portable terminal to receive a paging message within the $2^{nd}$ frame;

(2) during the frames of the first-type frame following the $2^{nd}$ frame, via a data/voice field, broadcasting the information to said portable terminal in sequence, and at same time broadcasting a voice data of a preceding frame allowing said portable terminal to receive continuous voice signal.

7. The method of claim 6, further comprising:

(3) during the second-type frame, changing value of a data/voice field pointer buffer in a corresponding time slot to point towards a voice buffer for immediately transmitting a connected real-time voice signal.

* * * * *